United States Patent Office 2,995,147
Patented Aug. 8, 1961

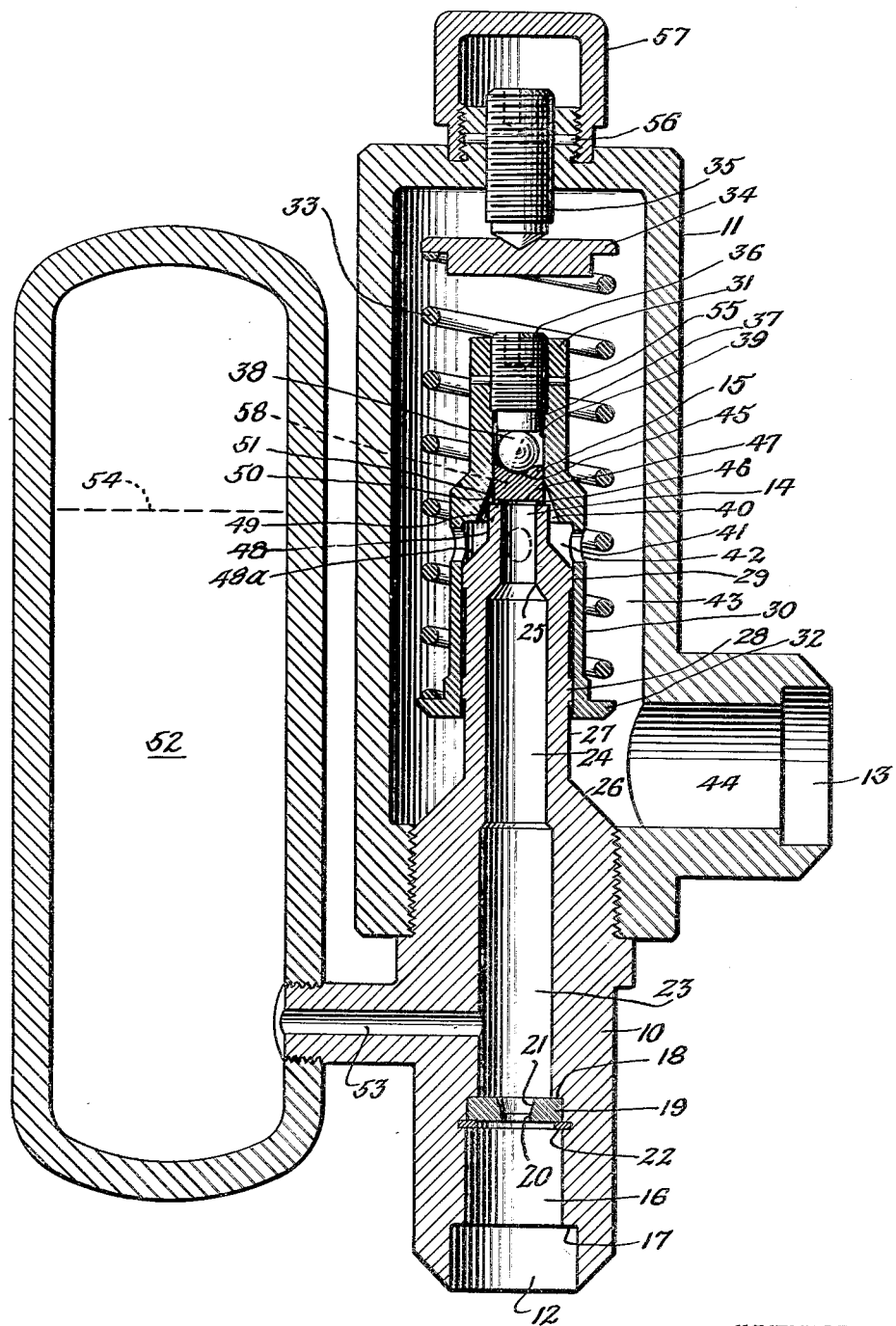

2,995,147
RELIEF VALVE
Theodore W. Bergquist, Horsham, Pa.
Filed Jan. 31, 1958, Ser. No. 713,080
19 Claims. (Cl. 137—475)

This invention relates to relief valves, and affords special advantages in systems handling non-compressible fluids, such as water, oil, etc. It is capable of controlling fluid release even in systems operating at unusually high unit pressures.

One of the primary objects of the invention is to provide a valve in which the disk will re-close, even at high system pressures, with blow-downs of 4% or less. Although this is not unprecedented in the design of valves adapted for the handling of compressible fluids, such as steam, it is, to the best of my information and belief, unheard of in systems which control non-compressible fluids. Nevertheless, there are some processing systems in which close control of blow-down is of vital concern.

Another outstanding object of the invention is to provide a relief valve in which the valve disk, on closing, will return fully and completely to its seat, with substantially total elimination of leakage.

Still another object of major importance is the provision of a relief valve which will close against pressures almost as high as the opening pressure, but which will nevertheless be stable against flutter, or cycling.

Other advantages include the provision of an extremely rugged device in which the spring and saddle structure is so devised as to contribute to the stabilizing of the movable portion of the valve, so as to assist in maintaining alignment of the parts, and reduce the over-all dimensions of the unit.

Another objective is the provision of a novel arrangement for adjusting the position of the valve disk and loading it in a manner which will reduce or eliminate any tendency of the disk to cock—that is, to move at an angle to the valve body instead of in precise alignment with the axis.

Other objects and advantages of the device of this invention will become apparent as this description proceeds.

In attaining these objects, I provide a structure which establishes conditions roughly analogous to those which prevail in the valve chamber of an isobaric valve, without, however, having to increase the free space available within the valve body in order to establish equalizing pressure chambers.

The word "analogous" is used because, even though in the present device, pressure tends to equalize when the valve opens, on both sides of the seating area (which is a characteristic of isobaric valves) it does not equalize all the way from inlet to exhaust, as it would if the valve were truly isobaric.

In the accompanying drawing, I have illustrated in vertical section, a valve device embodying features of my invention. These will become clearer as the following description proceeds, in relation to the drawing just referred to.

The valve shown comprises a body portion 10, and a bonnet or casing portion 11, which is in threaded engagement therewith. The inlet 12 is positioned at the bottom of the valve body 10, and the discharge 13 is laterally offset from the lower portion of the casing 11. The valve body 10 terminates at its upper end in a nozzle 14, which is directly below the valve disk 15.

Communication between the nozzle 14 and the inlet 12 is by way of a bore or channel, extending axially through the valve body 10. The diameter of the bore diminishes, preferably in stages, between the inlet 12 and the nozzle 14. At the first stage 16, the bore is somewhat smaller than the inlet, so as to afford an internal shoulder 17 against which the connecting line may abut. The lines are usually welded to the valve fittings in this type of service, but threaded connections may of course be used.

Shortly above the shoulder 17 is a second shoulder 18 marking a further reduction in the diameter of the bore. Against this shoulder 18 is fitted an orifice plate 19 which has a central opening 20 of considerably smaller diameter than the first stage 16 of the bore. In order to minimize eddy effects, this opening is preferably formed in the shape of a nozzle, having a cylindrical wall at the inlet side which merges into an outwardly flaring wall 21. The flow area of this central opening 20 is approximately equal to the flow area of the nozzle outlet 14. The orifice plate 19 is held in position preferably by means of a snap ring 22 which is retained in a groove provided in the valve body 10 for the purpose of receiving it.

Above the orifice plate is the second stage 23 of the valve bore, which is of smaller diameter than the first stage, and above this is the third stage 24, which is of smaller diameter than the second stage. The final reduction is achieved at the root 25 of the nozzle 14, producing a venturi effect.

Considering the external contours of the valve body 10: Directly above the threaded section which couples the body 10 and the casing 11 together, the valve body is tapered sharply inward as at 26, to a gland-like portion 27, which is of much smaller outside diameter than the lower portion of the valve body. This gland-like portion 27 is shaped to provide circumferential guide rings 28 and 29, which are spaced apart in a vertical direction and are in sliding contact with the inner wall of a guide member 30, which is formed as a cylindrical skirt extending vertically downward from the movable upper portion 31 of the valve body proper.

The lower end of the depending skirt 30 terminates in a peripheral flange 32 which serves as a seat to receive the lower end of the valve spring 33. The upper end of the spring 33 nests in the spring step 34, which is simply a rabbetted disk provided for that purpose. In the upper face of the member 34 a conical depression is provided which receives the mating tip formed on the lower end of the compression stud 35, the stud itself being in threaded engagement with the upper part of the bonnet 11.

The upper part of the disk holder 31 is drilled to provide an axially extending bore, which is tapped to receive in threaded engagement a loading stem 36, which is provided, at its lower end, with a nose portion 37, having a flat lower face. This face bears upon the ball 38, which thus transmits thrust through a single point at the center of the face of the loading stem 36 to the upper surface of the valve disk 15. The lower part 39 of the bore is not threaded. It closely engages the cylindrical wall of the valve disk 15, so as to maintain it in registry with the nozzle, although permitting enough motion to enable the disk to adapt itself to the nozzle seat.

The outer cylindrical wall of disk holder 31 flares outwardly and downwardly from a locus slightly below the upper level of the valve disk 15, merging into the depending skirt 30, previously referred to, which is of substantially larger diameter than the remainder of the member 31, and is preferably integral with it.

Fluid entering through the inlet 12 passes through the first stage of the bore 16, through the orifice plate 19, and into the second and third stages 23 and 24 of the valve bore, and thence into the nozzle 14. When pressure has built up sufficiently in the nozzle 14 to overcome the loading imposed on the spring 33 by the compression stud 35 on the spring step 34 and transmitted through the saddle 32, to the disk holder 31, the valve disk 15 will lift, thereby raising the ball 38, the loading stem 36, and with it the member 31 itself. As the disk rises, carrying with it the entire moving portion of the valve, it will be held firmly in alignment by the guiding surfaces of the rings 28, 29, bearing on the inner surface of the skirt 30.

Discharge occurs from the nozzle 14 in a lateral direction through the annular cavity 40 and exhaust space 41, to and through the discharge ports 42 and thence through the valve chamber 43 into the outlet passage 44 and the final outlet 13.

Attention is now directed to the structure of the valve disk 15. This is composed of an extremely hard alloy, preferably Stellite, which is also corrosion resistant. The disk itself is in the form of a cylindrical block, having in its upper surface a centrally located conical depression 45, to receive and center the ball 38, and having on the lower side, a depending annular seating flange 46 which projects downwardly slightly below the lower impact face 47 of the disk itself.

It will be observed that the inside diameter of the seating flange of the valve disk is slightly larger than the bore of the nozzle 14. As shown in the drawing, this difference has been somewhat exaggerated, for purposes of clarity. The belief that the impact face should exactly equal the nozzle bore in area is very firmly rooted indeed, in this art. Nevertheless, I have found that if the areas referred to are precisely the same, it is possible for an unbalance to occur in the distribution of the pressure load if it should happen that, through any cause whatever, the valve disk fails to maintain completely accurate registry with the nozzle bore. By making the seating flange just a little oversize, I ensure that pressure applied to the impact face will be uniform, even if some eccentricity should take place, and I regard this as possibly being one of the important reasons for the stability of the device of the present invention.

The outer cylindrical wall 48 of the nozzle 14 is slightly larger in diameter than the valve disk 15 which has just been described. At its lower end it merges into the sloping annular shoulder 48a of the valve body 26. The relationship between the moving and fixd parts of the valve is so adjusted that the outer rim of the shoulder 50 approaches, but does not touch the conical inner surface 49 of the member 31, which flares outwardly from a locus substantially below the upper surface of the valve disk 15.

There is thus provided an annular pressure cavity 51, which is defined by the outer vertical wall of the cylindrical valve disk 15, the outwardly sloping surface 49 within the body 31, and the shoulder 50 at the discharge face of the nozzle. In this way, fluid passing from the nozzle 14 into the pressure cavity 51 just described will have a higher pressure than prevails in the exhaust passage 41 which communicates with the discharge orifice 42. The pressure differential between that prevailing in the pressure cavity and that prevailing in the discharge passage is determined by adjusting the position of the loading stem 36, in such a way as to position the outwardly sloping conical inner surface 49 of the member 31, closer to or farther from the rim of the shoulder 50. This pressure cavity is one of the factors tending to equalize pressure on both sides of the nozzle opening.

For dynamic stability, I prefer to provide a series of diametrically opposite discharge ports 42. As shown herein, there are four of these ports, spaced at 90° intervals around the cylindrical skirt 30 of the disk holder 31.

When the valve herein described is used for the control of non-compressible fluids, it may happen that changes due to momentary fluctuations in the pressure prevailing at the inlet, or in back pressure prevailing at the outlet might influence the smoothness of valve operation. As a protection against fluctuations in pressure, I have provided an accumulator 52 which communicates through passage 53 with the second stage 23 of the valve bore. That is to say, the port into the valve bore is located in a position closely adjacent to the delivery side of the orifice plate.

The accumulator 52 is simply a sealed vessel in which a body of air or compressible gas may be trapped above the hypothetical upper surface of the liquid, as suggested by the transverse dotted line 54. Minor fluctuations in pressure of the non-compressible fluid are absorbed by compression of the gas trapped above the liquid level, as is well understood in this art. It is not essential to the operation of this device that an accumulator should be used. But such use will afford a substantial improvement in smoothness of operation. If it is used at all, I regard it as important that it should be connected into the system at a point fairly close to the discharge side of the orifice plate, so that it will be subject to reduced pressure and not directly affected by the velocity head.

The structure of this invention, as previously indicated, is intended primarily for use in the handling of liquids under extremely high pressure. Since this is a very hazardous type of service, it is desirable to take unusual precautions to avoid accidental disturbance of the valve adjustments. For this reason, I prefer to include locking devices, diagrammatically shown as pins 55 and 56. The first named will prevent rotation of the loading stem 36 once the proper setting of the valve has been attained. The second will prevent tampering with, or unintentional shift of, the compression stud 35, which bears upon the spring stop 34.

A cap 57 affords an additional measure of protection, to the compression stud, and helps also to ensure that there shall be no leakage from the valve chamber by way of the threaded connection of the stud.

Certain features of the structure just above described merit further discussion.

A primary advantage of the invention is the fact that the valve closes to a degree which permits practically no leakage at all. Extensive tests have been conducted with various relief valves known to the art, as a result of which one may entertain a doubt as to whether, with conventional valve devices, the valve disk ever returns to "absolute tightness" after it has once opened in service.

When a relief valve of conventional construction enters upon its closing cycle, movement of the disk will be fairly rapid until it reaches a point at which the flow will be in a thin sheet moving under high pressure through that portion of the opening which has not yet been closed by the disk. The force of the sheet is so great as to prevent further closing movement of the valve disk until the pressure beneath it has dropped to so low a value that it is no longer sufficient to overcome the pressure of the valve spring.

In other words, the disk will "hang" at a nearly closed position, thereby providing an extremely narrow channel through which fluid still moves. This channel may be only microns in thickness, and it operates as an efficient strainer, to remove from the liquid passing through it any and all particles of foreign matter which may be entrained in that fluid. This is quite a serious problem, in installations where the utmost precision is required, for the particles of foreign matter will tend to embed themselves in that portion of the valve disk face which is in contact with the valve seating surface or in the valve seating surface itself, so that it is most unusual to find a relief valve which has seen service but still does not "weep" at all. Indeed, in laboratory tests, I have not so far been able to discover one.

With the valve of the present invention, however, movement of the valve disk is not a gradual matter, increasing in rapidity as the velocity head builds up behind it, but is instead a snap action. Therefore, the duration of the interval within which wire drawing may occur is infinitely small—so small indeed as to leave room for the suggestion that the inertia of the fluid itself will not have been overcome before the opportunity for wire drawing has passed. Similarly, since the valve moves with snap action from fully open to fully closed position, there is no opportunity for the high-velocity sheet to form as the disk approaches fully closed position. Consequently, there is no time at which the valve disk hangs in an almost completely closed position, and there is, therefore, no strainer action on the fluid passing through.

I have not yet succeeded in demonstrating mathematically to my complete satisfaction all of the reasons why the valve disk moves with a snap action, both in opening and in closing movement. But this characteristic action is attributable, at least in part, to the presence of the annular pressure cavity 51, which lies between the conical surface 49 and the outer rim 50 of the nozzle.

In the present structure, as in prior devices, opening of the valve disk reduces the pressure head below the disk, and creates a velocity head which compensates for the pressure drop. But in the present device, escaping fluid is momentarily trapped in the pressure cavity 51, and this retards the velocity of the escaping fluid and creates a moderate pressure head. Since this operates also on the annular surface 49, it affects a larger area than that of the impact face alone, and thus augments the lifting moment attributable to the velocity and pressure of the fluid against the impact face of the valve disk. Consequently, the valve disk does not first crack open and then lift gradually, but rather snaps from fully closed to fully open position, like a pop valve.

On the other hand, when the pressure of fluid has been relieved through the valve, it snaps to fully closed position. It is my belief that the modulating effect provided by the orifice plate 19 contributes to this result, by reducing the velocity head through the valve.

Whatever the cause may be, the fact is that the valve disk and its associated parts move quite suddenly from a substantially fully-open position to a completely closed position, even when the spring employed is very much lighter than is customary in this type of service. The valve of this invention will operate to produce substantially "absolute tightness" even though the spring rating (measured in pounds per inch of deflection) may vary over a wide range. In actual test, equally good results were secured with many different springs, the strongest of which had a spring rating twenty times as great as the weakest.

The expression "absolute tightness" is used generally in a relative sense. Here, however, it is almost literally accurate. The valve of this invention, after having operated 200 times at an opening pressure of 2450 pounds, has been held closed for a standard leakage test under 2400 pounds pressure for a time interval five times as great as that required by Government specifications, and has manifested no leakage whatever. A leakage factor even as high as 50 cc. per hour, at such pressure, does not disqualify a valve for Government acceptance. This is not to say that no leakage at all is ever likely to occur in the valve of this invention. But it does indicate that the valve is leak-proof to an unprecedented degree.

Another factor making for tightness and stability is the arrangement of the valve disk holder and its depending skirt. The skirt 30 is preferably integral with the movable part 31 of the valve body, and is very accurately machined to make telescopic engagement with the guiding surfaces of the fixed portion of the valve body 27, at the peripheral rings or shoulders 28 and 29. Because the loading and guiding functions of the valve are related to an area well below the center of pressure, the movable portion of the valve is unusually free of any rocking moments. The valve disk 15 is not pushed into contact with the seat by a spring which is mounted above it, but is rather pulled towards the nozzle seat by tension which is transmitted through the skirt. The spring force is applied to the bottom of the skirt, well below the center of pressure.

Another reason for the tightness of closure of the present valve is the careful proportioning of the disk and its loading face.

It has long been known that when the height of a right cylinder mounted in a closely-fitted bore is less than three times the radius, the cylinder will be capable of cocking in the bore. Consequently, valve designers who have attempted to use a bore-guided valve disk to effect a tight closure against extreme pressure have, quite logically, attempted to make the disk as stable as possible by providing that its height is at least three times its radius. Surprisingly enough, I have found that a completely stable disk will not ensure a completely tight seal, no matter how heavy the spring. The disk must have some freedom to shift in order to accommodate itself precisely to the seating surface at the nozzle outlet. The degree of freedom should be as small as possible, but there must be some.

This discovery is embodied in the valve disk mounting here disclosed, wherein the disk is less than twice the radius in height, but is still long enough to be firmly held in alignment with the axis of the valve by reason of its contact with the bore wall, while still projecting far enough from the mouth of the bore to provide one wall of the pressure cavity 51. Any tendency to cock is counteracted by the conical depression in the upper face of the disk, which tends to equalize the thrust imposed by the loading stem through the sphere 38.

Where the sphere touches the conical wall of the depression, it will establish a circle of tangency. The thickness of the disk, the angle of slope, and diameter of the sphere must be so calculated that the base of the imaginary cone of force which passes from the center of the sphere through the circle of tangency will not extend beyond the periphery of the disk at the plane of the seating face. Any line of thrust, such as the dotted line 58, lies in this cone of force. When this rule is observed, the disk is inherently stable, yet has sufficient freedom to adjust itself precisely to the seat about the nozzle. As previously noted, the fact that the loading stem has a planar end surface permits the sphere to center itself freely in the valve disk, thus increasing stability and avoiding side thrust entirely.

The features just above all contribute largely to the unusual degree of fluid tightness which characterizes the valve of this invention. They also contribute to some extent to another of its major advantages, which is unusual stability. The valve disk of this invention does not flutter or chatter, either during opening or closing movement or while fully open.

I believe that one of the reason for the phenomenal behavior of the valve assembly is the modulating effect of the orifice plate 19, in relation to the nozzle 14, and the restricted escape passage between the surface 49 and the shoulder 50. I suspect that the result of this arrangement is to provide substantially isobaric conditions within the valve.

The use of the orifice plate 19 is contrary to all accepted practice in this field, which has long understood that the inlet bore should not by any means be obstructed, beyond the reduction in diameter relied upon to create the usual venturi effect. This modulating orifice provides a "conversion space" in stages 23 and 24, where velocity heat will be reduced, thereby permitting the valve to act more under the influence of pressure head as such, existing in a region which is partially isolated from the direct influence of system pressure, thereby reducing the effect of stream velocity.

The volume of the "conversion space" afforded by the stages 23 and 24 may vary. I have not yet found the extreme limits which may still be effective. But excellent results will be secured when the length of these stages, combined, is between six and eight times the widest diameter of the larger stage.

In any case, the conversion space ensures that velocity itself shall not play too large a part in acting on the valve disk. Here again, it is important to bear in mind the relationship between the conical face 49 and the shoulder 50 which together define the discharge passage from the nozzle space. Because of the restriction which this obstructive passage affords, there is a pressure control throughout the nozzle and disk assembly which cannot be attained in other valve structures with which I am familiar.

By reasons of the pressure which builds up in the annular pressure cavity between the outer surface of the valve disk, the sloping face 49, and the rim 50 of the nozzle, the "vena contracta" effect is overcome, and the disk will not vibrate or chatter at all. "Vena contracta" is the name given to a phenomenon peculiar to velocity flow through an orifice. Fluid entering an orifice at high velocity will fill the cross sectional area of the orifice, but the cross sectional area of the stream will diminish as the stream travels, until it measures only 60% of the orifice area. In the annular space which surrounds the stream, the pressure will be lower than atmospheric. Since that is the condition which prevails near the outer periphery of a conventional valve disk, it will be seen that the disk itself is thrust away from its seat by the fluid but drawn back towards its seat by the low pressure area. It is this unbalance of forces which causes a valve disk to cycle, or flutter.

The pressure in the cavity 51 completely eliminates this problem, for it fills the space between the core of the stream and the outer periphery of the valve disk, so that the usual low-pressure area is not present.

Another feature of the device here shown is the contribution to valve stability which is afforded by the configuration of the seating face of the valve disk. The diameter of the impact face is, as has been mentioned, slightly larger than the diameter of the nozzle itself. Even if, under stress of service, the valve disk should take up a position which is off-center with relation to the axis of the nozzle, the fluid pressure can still reach only the same area (namely the impact face) which it could affect if the parts were still concentric. Thus the force acting on the disk is uniform over its entire effective surface, and is uniformly effective, whether the valve be open or closed. This increases stability and reduces the tendency of the valve disk to cock.

In contrast, it has been regarded as essential heretofore, in constructing valve disks having a seating flange, to give the flange an inside diameter which is precisely equal to the diameter of the valve nozzle. With that type of structure, any movement of the valve disk away from a truly axial position exposes a portion of the lower face of the seating flange to pressure, while still permitting pressure to be exerted over the entire impact face. This results in a slight increase in pressure on the valve disk, eccentrically applied, tending to tilt the disk, or alter its response. Such results, particularly in the control of low-pressure fluids, have in the past, been of relatively slight consequence. But in the unusually severe service in which the valve of the present invention attains its most dramatic usefulness, any such difference in pressure applied to the disk as a whole would be likely to impose an irremediable unbalancing moment on the valve disk, and to induce erratic behavior of the valve itself.

Another feature of the structure illustrated is the fact that the valve disk as such is adjusted in position when the valve is first placed in operation, and does not thereafter move at all with relation to the movable portion 31 of the valve. Consequently, it is possible to use a relatively short cylindrical section as the valve disk, and this brings the center of mass of the disk as close as possible to the center of mass of the sphere 38 so that maximum stability in the imposition of thrust is automatically ensured. There seems to be no tendency whatever for the valve disk to cock in the valve body or to take any position except one in which the lowermost plane of the seating flange is in planar contact, throughout its entire periphery, with the rim of the valve nozzle 14.

The structure illustrated may obviously be modifiied in various respects without departing from the spirit of the invention. These need not be pointed out in detail.

However, there are some modifications which might not be equally apparent, which should therefore be mentioned. For instance, it is impossible to provide an adequate conversion zone even in situations where clearance limitations forbid the use of a valve having an elongated body. This can be done by obstructing axial flow through the modulating orifice, so as to effect discharge at an angle or even normal to the axis. Under such conditions, the bore may be considerably shorter, while yet affording ample space for the conversion of velocity to pressure. It must, of course, have a cross sectional area on the discharge side of the plate which is much greater than the orifice area.

Furthermore, since it is possible to adjust the clearance between the wall 49 of the pressure space 51 and the rim 50 of the nozzle, and to adjust the volume of that space, it is possible to control the pressure conditions therein, in relation to those prevailing at the modulating orifice, in such a way as to provide isobaric conditions, even if the nozzle diameter were to be substantially larger than the diameter of the modulating orifice. One of the important relationships to keep in mind is that which exists between the modulating orifice and the restricted passage through which fluid escapes from the annular pressure cavity 51. This relationship may be modified by control of the lift of the valve disk and the diameter of the discharge nozzle, as previously indicated. Another important feature is the provision of a structure in which at least some of the velocity head in the bore of the valve may be converted to pressure before the nozzle is reached.

In addition, the other relationships previously mentioned also play important parts, such as, for example, the fact that the impact face of the underside of the valve disk is of somewhat larger diameter than the actual bore of the nozzle; the fact that the force applied by the spring saddle is below the center of pressure and well below the center of gravity of the movable part of the valve; and the fact that the adjusting pressure exerted on the ball 38 is transmitted from a plane surface at the end of the adjusting stud to a contoured surface on the top of the valve disk. These features all contribute to the successful operation of the valve herein described, in attaining the various quite different advantages which this structure affords.

For extreme service, it is desirable that the reacting parts of the valve be made of extremely hard, polished metal, such as Stellite, which is a commercially available alloy of tungsten, cobalt and chromium. These parts are the seating face of the nozzle, the valve disk in its entirety, the thrust bearing or sphere, and the nose of the loading stem.

Although I have indicated that the valve of this invention manifests its greatest usefulness in the handling of non-compressible fluids at extreme pressure levels, it will, of course, be obvious that the mechanism which can handle extreme loads under most severe conditions is not limited in its usefulness to that field, but may be used with advantage in low pressure systems, and even in systems where the fluid handled is compressible.

In this description, and in the claims which follow, wherever adverbs of place are used, it is to be understood that these are used by way of convenience, in relation to the position of the device as shown in the accompanying drawing. It is, of course, apparent that the device of the present invention could be mounted horizontally, or even in an inverted position, without destroying its intended function, provided only that the connection through the wall of the accumulator is made at a point which will ensure the presence of a body of liquid between the inlet to the accumulator and the space in which compressible gas is trapped.

I claim:
1. In a valve of the character described, a valve body portion having an inlet of substantial area at one end, a nozzle opening of substantially smaller area than the inlet at the other end, and having an axial channel communicating between said inlet and said nozzle; a movable valve disk having a seat engageable with the body portion around said nozzle opening and yieldingly urged against the body portion to close the nozzle opening; and a modulating orifice plate transversely positioned across said channel in a zone of large area near the inlet, said plate having a centrally located aperture therein which is of considerably smaller area than the channel area at the point where the plate is positioned.

2. A relief valve according to claim 1, in which an accumulator is connected into the valve bore at a point adjacent the modulating orifice plate and on the downstream side thereof.

3. Valve mechanism capable of controlling the flow of liquids under extreme pressure, and comprising a valve body having an inlet of substantial diameter mounted in a valve casing having an outlet of substantial diameter, said body extending to a mid region of said casing, and there terminating in a nozzle structure having a peripheral wall of considerable thickness; a valve disk holder having means for adjustably positioning a valve disk therein, and in axial alignment therewith; a valve disk in the form of a right cylinder having an outside diameter considerably smaller than the outside diameter of the nozzle portion and a height at least as great as its radius, seating surfaces being provided on the mating face of the valve disk and the mating face of the nozzle, said disk holder being mounted in axial alignment with said valve body and further being configured to closely engage the valve disk throughout a portion only of its axial extent, and having an inner configuration such as to provide a wall surface extending outwardly and thence axially from the plane of contact with the disk structure, whereby to provide a pressure cavity defined in part by such wall surface, in part by the exposed cylindrical wall of the valve disk, and in part by the peripheral rim of the nozzle; a transverse plate mounted in the body of the valve near the inlet end, and having a centrally disposed fluid passage therethrough; said valve body being configured to provide an extended conversion space between said plate and said nozzle of substantially larger diameter than the fluid passage through said plate, whereby to provide for equalization of the dynamic pressure head as between the fluid passage and the outlet from the pressure cavity.

4. A valve disk mounting assembly comprising a cylindrical trunk having an axially extending bore therethrough and a flaring skirt portion extending radially outwardly and thence axially in cylindrical form, said skirt having an external peripheral flange near one end to receive a load imposing element, the inner wall of the cylindrical portion of the skirt being provided with an accurately finished guiding surface, a loading stem entering the axially extending bore and capable of longitudinal adjustment therein, one end of said loading stem providing a smooth planar surface normal to the axis of the stem, a spherical thrust bearing in said bore in contact with said planar surface, and a valve disk in the form of a right cylinder of a height approximating one-half of its diameter, positioned in said bore but extending therebeyond in a direction toward said flange, said disk having a central conical depression in its one face in contact with said spherical thrust bearing, and having a seating surface on its other face, the diameter of the sphere and the wall slope of said conical depression being such as to ensure that any projected radius of the sphere which passes through the circle of tangency will fall within the outer periphery of the seating surface of the disk.

5. In a relief valve structure adapted to the control of liquids at high pressure, the combination of a nozzle rimmed with an annular seating surface, a valve disk having a depending seating flange, a valve disk holder having means maintaining it in axial alignment with said nozzle and having an axial bore receiving said disk and positioning it in substantially concentric relation to the nozzle axis while yet providing sufficient freedom of movement to permit the disk to adjust itself accurately to the seating surface, thrust-transmitting means mounted in said bore comprising a part affording a surface which is at least parti-spherical and a part affording a non-congruent surface in contact with the surface first named, said parts being configured to ensure that any thrust line which contains a radius of said spherical surface and a contact point will intersect the seating surface of said flange, the seating flange being of an inner diameter greater than that of the nozzle opening, whereby to ensure that system pressure acting on the working face of said disk will remain constant even when radial thrust imposed upon the disk causes it to shift from a truly concentric relation to the nozzle axis.

6. A relief valve for high pressure liquids comprising a valve nozzle having a large diameter inlet at one end and terminating in a rimmed outlet of substantially reduced diameter at the other end; a centrally-apertured plate positioned transversely of the nozzle bore within the inlet, the aperture in said plate being of similar size to the nozzle outlet, said nozzle being provided with an internal chamber of substantially greater diameter than said aperture, in a region between said plate and said outlet; a seating face at the nozzle outlet, and a valve disk having a seating face adapted to mate therewith; a carrier member for said disk, mounted for movement in axial alignment with said nozzle, and having an axially extending bore in which the disk is received; means adjustably mounted in said bore for transmitting thrust between said disk and said carrier and for varying the axial relationship therebetween, said bore being increased in diameter below the disk receiving point, to provide an annular pressure space between its inner surface and the nozzle rim.

7. Valve structure as defined in claim 6, wherein the valve disk carrier includes a skirt member which surrounds the external surface of the nozzle body, and cooperating guiding surfaces are provided on the inner wall of the skirt and the outer wall of the valve body, to maintain the carrier and the nozzle in axial alignment when the carrier moves.

8. Valve structure as defined in claim 7, in which the skirt member is provided at its lower part with an external projection; a bonnet enclosing the parts referred to being fixedly secured to the nozzle; and adjustable loading means being provided, reacting between said bonnet and said projection, to permit variable loading of said valve.

9. In a relief valve adapted for use with high pressure liquids, a valve disk of cylindrical form having a seating face on one end and having a concentric conical depression in its opposite end; a disk holder having means maintaining it in axial alignment with a valve nozzle, and having an axially extended bore therein, within the mouth of which the valve disk is received with freedom for angular motion to accommodate accurate valve seating; a sphere positioned in said bore and touching the wall of the conical depression in the disk along a circle of tangency and serving to transmit thrust between the sphere and the disk holder; the slope of the conical depression being such as to ensure that any line of force passing from the radius of the sphere through the circle of tangency will intersect the seating face within the periphery of the disk.

10. In a relief valve, the structure defined in claim 9 in which the seating face on the valve disk is carried on an annular flange which projects axially from the body of the disk.

11. In a relief valve, the structure defined in claim 9 in which the loading stem is adjustably positioned in the disk holder.

12. A relief valve adapted for use with high pressure liquids, having a body portion comprising a nozzle structure provided with a metallic annular seating face at the nozzle outlet, a metallic valve disk having a height of the order of one-half of its width, and having a depending annular seating flange adapted to seat upon the annular seat first named, said flange having an inside diameter greater than the inside diameter of the nozzle, and having an external diameter substantially smaller than the external diameter of the nozzle structure; a disk holder mounting and positioning the valve disk and having means maintaining the disk holder and the disk in axial alignment with the nozzle, the internal surface of said disk holder having an offset the dimension of which increases radially from the locus in which the disk is received and being extended towards the nozzle inlet whereby to provide a pressure zone between said offset surface, the projecting cylindrical wall of the disk, and the transverse face of the nozzle.

13. A relief valve adapted for use with high pressure liquids, having a body portion comprising a nozzle structure provided with a metallic annular seating face at the nozzle outlet, a cylindrical metallic valve disk having a height of the order of one-half of its width, and having a seating face adapted to seat upon the annular seat first named, said disk having an external diameter substantially smaller than the external diameter of the nozzle structure; a disk holder having a cylindrical skirt portion engaging and retaining the holder and valve disk in axial alignment with the nozzle, the internal surface of said disk holder having an offset the dimension of which increases radially from the locus in which the disk is received, and being thence extended axially in surrounding relationship to the nozzle structure, whereby to provide a pressure chamber between the offset internal surface of the disk holder, the projecting cylindrical wall of the disk, and the transverse face of the nozzle structure.

14. A relief valve, adapted for the control of liquids at high pressure, comprising a casing and, mounted therein, an elongated nozzle member having an external surface coaxial with the nozzle, and having a generally transverse metallic seating face at the nozzle outlet; a valve-disk carrier having an upper cylindrical portion with an axially extending bore and a lower skirt portion functionally integral with said upper portion, said skirt portion having an internal coaxial surface in telescopic engagement with the first-named surface, and, at its lower part, an external annular flange; a metal valve disk, having a thickness greater than its radius and less than three times its radius, housed at least in part within the bore of the carrier and having an annular seating face mating with the seating face first mentioned; stud means adjustably mounted in the bore of said carrier for varying the axial position of the valve disk in relation to said carrier; and spring means reacting between the casing and said flange, to cause the carrier to pull the disk towards closed position.

15. A structure as defined in claim 14, wherein the valve disk has an annular seating flange of greater internal diameter than the bore of the nozzle.

16. A structure as defined in claim 14, wherein the bore provided in the upper portion of the disk holder flares outwardly and downwardly from the locus in which the disk is positioned, to provide an annular pressure cavity above the transverse face of the nozzle.

17. In a relief valve for use with liquids under high pressure and having a movable relief valve disk, a valve nozzle structure having a nozzle outlet opening adapted to register with said disk, having an inlet of diameter substantially greater than that of the nozzle outlet opening, and a centrally apertured plate mounted transversely of the nozzle axis at a point adjacent to but downstream from the inlet, the diameter of the aperture in said plate being similar to that of the nozzle outlet, and the nozzle being so configured as to provide a chamber of substantially greater diameter than that of the aperture, in a region between the plate and the nozzle outlet.

18. In a relief valve for high pressure liquids, a nozzle structure as defined in claim 17, and an accumulator operatively connected into the chamber by way of a port positioned near the plate and on the downstream side thereof.

19. In a high pressure liquid relief valve structure having a valve element mounted for yielding displacement under pressure increase of the liquid to relieve the pressure, a valve body having an interior cavity with a pressure relief discharge port adapted to cooperate with said valve element, the interior cavity of said body also having an inlet portion for receiving the pressure liquid, said inlet portion being of larger flow area than said discharge port, and an orifice plate in the cavity of the valve body intermediate the inlet portion and the discharge port, the cavity in the valve body having another portion at the downstream side of the orifice plate which is also of larger flow area than the discharge port, the orifice of said plate having a substantially smaller flow passage than cavity portions at the upstream and downstream sides of the plate.

References Cited in the file of this patent
UNITED STATES PATENTS

| Re. 18,850 | McClellan et al. | May 30, 1933 |
| 1,690,097 | Ackerman | Nov. 6, 1928 |
| 1,836,416 | Weber | Dec. 15, 1931 |
| 2,317,395 | Mercier | Apr. 27, 1943 |
| 2,517,858 | Farris | Aug. 8, 1950 |
| 2,527,381 | St. Clair | Oct. 24, 1950 |
| 2,530,091 | Smith | Nov. 14, 1950 |
| 2,827,925 | Meibaum | Mar. 25, 1958 |